US012791468B2

(12) United States Patent
Zhang et al.

(10) Patent No.: US 12,791,468 B2
(45) Date of Patent: Nov. 10, 2026

(54) FIBER-OPTIC SEAWATER SALINITY SENSOR SYSTEM AND PREPARATION METHOD THEREOF

(71) Applicant: TIANJIN UNIVERSITY, Tianjin (CN)

(72) Inventors: Hongxia Zhang, Tianjin (CN); Zongjie Zhang, Tianjin (CN); Chunran Cao, Tianjin (CN); Qingyang Meng, Tianjin (CN); Dagong Jia, Tianjin (CN); Tiegen Liu, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 106 days.

(21) Appl. No.: 19/013,703

(22) Filed: Jan. 8, 2025

(65) Prior Publication Data

US 2026/0118261 A1 Apr. 30, 2026

(30) Foreign Application Priority Data

May 23, 2024 (CN) ......................... 202410646660.0

(51) Int. Cl.
*G01N 21/33* (2006.01)
*G01J 3/42* (2006.01)
(Continued)

(52) U.S. Cl.
CPC ................ *G01N 21/33* (2013.01); *G01J 3/42* (2013.01); *G01N 21/01* (2013.01); *G01N 21/43* (2013.01); *G01N 21/55* (2013.01); *G01N 21/8507* (2013.01); *G01J 2003/425* (2013.01); *G01N 2021/8528* (2013.01); *G01N 2201/088* (2013.01); *G06F 17/10* (2013.01)

(58) Field of Classification Search
CPC ........ G01N 21/01; G01N 21/33; G01N 21/43; G01N 21/55; G01N 21/8507; G01N 2021/8528; G01N 2201/088; G01J 3/42; G01J 2003/425; G06F 17/10
See application file for complete search history.

(56) References Cited

U.S. PATENT DOCUMENTS

2019/0068864 A1* 2/2019 Ohashi .................. A61B 1/044

FOREIGN PATENT DOCUMENTS

CN 108955774 A * 12/2018 ............ G01N 21/25
CN 110108669 A 8/2019
(Continued)

OTHER PUBLICATIONS

English translation of CN 108955774 A (Year: 2018).*

*Primary Examiner* — Mark R Gaworecki

(57) ABSTRACT

The present disclosure discloses a fiber-optic seawater salinity sensor system and preparation method thereof, including a semiconductor laser unit, a Y type optical fiber, a fiber-optic seawater salinity sensor, an optical spectrometer, and a computer which are connected in series via a multimode optical fiber, wherein light emitted out of the semiconductor laser unit with a center wavelength of 405 nm is transmitted to the fiber-optic seawater salinity sensor via the Y type optical fiber, a sensor probe of the fiber-optic seawater salinity sensor is immersed in seawater, reflected light is reflected to the optical spectrometer via the Y type optical fiber, and the computer receives and processes a spectrum from the optical spectrometer to obtain spectral intensity of the reflected light from the optical spectrometer.

9 Claims, 4 Drawing Sheets

(51) Int. Cl.

| | |
|---|---|
| ***G01N 21/01*** | (2006.01) |
| ***G01N 21/43*** | (2006.01) |
| ***G01N 21/55*** | (2014.01) |
| ***G01N 21/85*** | (2006.01) |
| ***G06F 17/10*** | (2006.01) |

(56) References Cited

FOREIGN PATENT DOCUMENTS

| | | | |
|---|---|---|---|
| CN | 115597658 | A | 1/2023 |
| CN | 116519635 | A | 8/2023 |
| CN | 116990262 | A | 11/2023 |

* cited by examiner

FIBER-OPTIC SEAWATER SALINITY SENSOR SYSTEM AND PREPARATION METHOD THEREOF

CROSS-REFERENCE TO RELATED APPLICATION

This application claims priority from the Chinese patent application 2024106466600 filed May 23, 2024, the content of which is incorporated herein in the entirety by reference.

TECHNICAL FIELD

The present disclosure belongs to the field of fiber-optic sensors, and particularly relates to a fiber-optic seawater salinity sensor system based on a reflection coefficient and evanescent wave attenuation and a preparation method thereof.

BACKGROUND

The salinity of the ocean is closely related to factors, such as ecology, climate, and marine aquaculture. Particularly, over the past century, rapid industrial development and a significant increase in energy consumption have led to global warming and the melting of glaciers. The salinity levels of the Atlantic, Pacific, and Indian Oceans have experienced varying degrees of decline. The issue of the ocean is a global concern, creating an urgent demand for the real-time monitoring of changes in the salinity levels of the ocean.

Currently, conductivity-temperature-depth (CTD) profilers are the most commonly used instrument for measuring seawater salinity levels. Based on salinity measurement, the CTD profilers offer high accuracy; however, existing CTD profiles face many challenges, such as high cost, marine corrosion, and electromagnetic interference. Fiber-optic sensors can effectively overcome the defects of the CTD profilers, creating a mutually beneficial relationship.

In the existing fiber-optic seawater salinity sensors that have been disclosed, their operating principles include surface plasmons effect (CN110108669A), Fabry Pérot (F-P) cavity optical interferometry (CN115597658A, CN116990262A, and CN116519635A), and the like. Although fiber-optic sensors have made significant advancements after development over the past few decades, they still face many issues, such as (1) complex structure; (2) stringent requirements for preparation processes; (3) long response time; and (4) complicated demodulation. Therefore, the current important research is to design a fiber-optic seawater salinity sensor that is structurally simple, easy to prepare, and highly practical.

SUMMARY

In view of deficiencies in the prior art, the present disclosure provides a fiber-optic seawater salinity sensor system and a preparation method thereof. Based on a reflection coefficient and evanescent wave attenuation, the present disclosure implements the fiber-optic seawater salinity sensor system that is structurally simple, easy to prepare, and highly practical.

In Order to Fulfill the Above Objective, the Present Disclosure has the Following Technical Solutions:

A fiber-optic seawater salinity sensor system includes a semiconductor laser unit, a Y type optical fiber, a fiber-optic seawater salinity sensor, an optical spectrometer, and a computer which are connected in series via a multimode optical fiber; wherein light emitted out of the semiconductor laser unit is transmitted to the fiber-optic seawater salinity sensor via the Y type optical fiber, a sensor probe of the fiber-optic seawater salinity sensor is immersed in seawater, reflected light is reflected to the optical spectrometer via the Y type optical fiber, and the computer receives and processes a spectrum from the optical spectrometer to obtain spectral intensity of the reflected light from the optical spectrometer.

A Preparation Method of a Fiber-Optic Seawater Salinity Sensor is as Follows:

A preparation method of a flat surfaced seawater salinity sensor as the fiber-optic seawater salinity sensor includes the following steps:

- cutting an optical fiber, grinding and polishing an end face of the optical fiber to be smoothened and flattened, and finally washing the end face with water to remove any residual substance.

A preparation method of a tapered seawater salinity sensor as the fiber-optic seawater salinity sensor includes the following steps:

- grinding and polishing an end face of an optical fiber with a core diameter of 1 mm to be smoothened and flattened, and washing the end face with pure alcohol and purified water;
- allowing the washed optical fiber to be vertically immersed in a hydrofluoric acid solution with a concentration of 40%, and etching the optical fiber with an etching time difference of immersing the optical fiber along its length to form a tapered optical fiber; adjusting a taper of the tapered fiber-optic seawater salinity sensor by controlling an immersion depth of the optical fiber in the hydrofluoric acid solution and the etching time; wherein in this case, the optical fiber is immersed at a depth of 5 mm and etched for 28 hours; after removing a remaining coating outside a tapered region at the end of the optical fiber, rinsing the surface with water to remove residual hydrofluoric acid solution and reaction products; allowing the etched optical fiber to be sequentially immersed in a 1.0 mol $L^{-1}$ $Na_2CO_3$ solution and water for ultrasonic treatment for 20 minutes and 1 minute, respectively, until the surface is smooth; and finally, wiping the surface of the sensor with alcohol.

Compared with the Prior Art, the Present Disclosure has the Following Beneficial Effects and Advantages:

Due to the simple structure and case of preparation, the present disclosure can achieve preparation in a chemical etching method at room temperature, allowing for the simultaneous preparation of multiple optical fibers, thus facilitating batch preparation. In addition to advantages such as short response time, wide measurement range, and high stability, the present disclosure further has the advantages of simple structure, easy preparation, energy conservation, high efficiency, and strong practicality, making the fiber-optic seawater salinity sensor highly significant for widespread application.

BRIEF DESCRIPTION OF THE DRAWINGS

FIGS. 1A-1B are structural schematic diagrams illustrating a fiber-optic seawater salinity sensor according to embodiments of the present disclosure, wherein FIG. 1A is a flat surfaced fiber-optic seawater salinity sensor, and FIG. 1B is a tapered fiber-optic seawater salinity sensor;

REFERENCE SIGNS

1. multimode optical fiber, 2. incident light, 3. reflected light, 4. evanescent wave, 5. transmitted light, 6. semiconductor laser unit, 7. Y type optical fiber, 8. optical spectrometer, 9. computer, 10. seawater salinity sensor, 11. seawater, 12. multimode optical fiber, and 13. LCD display module.

DETAILED DESCRIPTION OF THE PRESENT DISCLOSURE

The technical solution of the present disclosure will be described in detail with reference to accompanying drawings and specific embodiments.

Figure 1A:
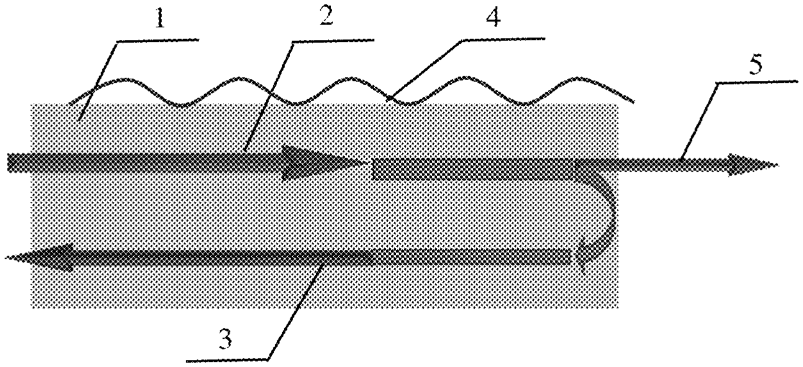
Figure 1B:
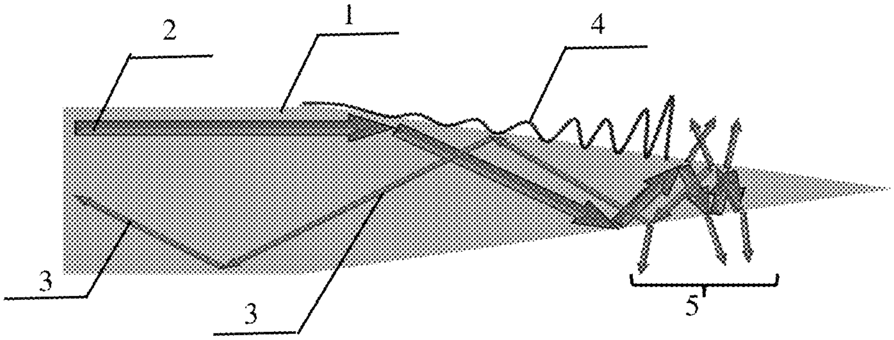

FIGS. 1A-1B shows a fiber-optic seawater salinity sensor structure according to embodiments of the present disclosure. In this specific embodiment, a flat surfaced or tapered fiber-optic seawater salinity sensor is selected. A fiber-optic seawater salinity sensor in FIG. 1A is a flat surfaced multimode optical fiber, and a fiber-optic seawater salinity sensor in FIG. 1B is a tapered multimode optical fiber. A propagation pathway of light in the fiber-optic seawater salinity sensor includes incident light 2, reflected light 3, an evanescent wave 4, and transmitted light 5. An angle of incidence of the reflected light at a tail end of the tapered multimode optical fiber will become smaller than a critical angle. Some of the light is transmitted into seawater rather than being reflected to an optical spectrometer.

When the light propagates in the optical fiber in a form of total reflection, the evanescent wave is generated on a surface of the optical fiber. Evanescent wave intensity increases with the rise of an index of refraction of the seawater, resulting in an increase in optical loss. A penetration depth, $d_p$, of the evanescent wave and an index of refraction, $n_2$, of the seawater meet the following relational expression:

$$d_p = \frac{\lambda}{2\pi n_1\left[\sin^2\theta_i - (n_2/n_1)^2\right]^{1/2}}$$

The fiber-optic seawater salinity sensor detects changes in spectral intensity of the reflected light caused by changes in seawater salinity, so as to detect the salinity of the seawater. The spectral intensity and a reflection coefficient of the reflected light from the optical spectrometer are closely related to the salinity of the seawater.

Although the fiber-optic seawater salinity sensor system can employ the flat surfaced or tapered seawater salinity sensor, the tapered fiber-optic seawater salinity sensor, compared to the flat surfaced fiber-optic seawater salinity sensor, can effectively increase the number of reflections and the quantity of resultant evanescent waves, as well as effectively enhance the concentration of the evanescent waves on the surface, which is beneficial for salinity sensing. Meanwhile, the improvement of the tapered structure in rapid response is significant. Additionally, the optimized taper can be used for adjusting the evanescent wave and improving sensor sensitivity.

A preparation method of the flat surfaced fiber-optic seawater salinity sensor includes the following steps:

step 1. an optical fiber with a core diameter of 1 mm was cut;

step 2. an end face of the optical fiber was ground and polished to be smoothened and flattened; and step 3. the end face was washed with water to remove residuals.

The tapered fiber-optic seawater salinity sensor is prepared in a chemical etching method. A preparation method of the tapered fiber-optic seawater salinity sensor includes the following steps:

step 1. an end face of an optical fiber with a core diameter of 1 mm was ground and polished to be smoothened and flattened;

step 2. the end face was washed with pure alcohol and purified water;

step 3. the clean optical fiber was vertically immersed in a hydrofluoric acid solution with a concentration of 40%, and etched with an etching time difference of immersing the optical fiber along its length to form a tapered optical fiber;

step 4. a taper of the tapered fiber-optic seawater salinity sensor was adjusted by controlling an immersion depth of the optical fiber in the hydrofluoric acid solution and the etching time; wherein the optical fiber was immersed at a depth of 5 mm and etched for 28 hours;

5. after removing a remaining coating outside a tapered region at the end of the optical fiber by an art knife, the surface was rinsed with water to remove residual hydrofluoric acid solution and reaction products;

6. in order to achieve the smooth surface, the etched optical fiber was sequentially immersed in a 1.0 mol $L^{-1}$ $Na_2CO_3$ solution and water for ultrasonic treatment for 20 minutes and 1 minute, respectively; and 7. finally, the surface of the sensor was wiped with alcohol.

Figure 2:
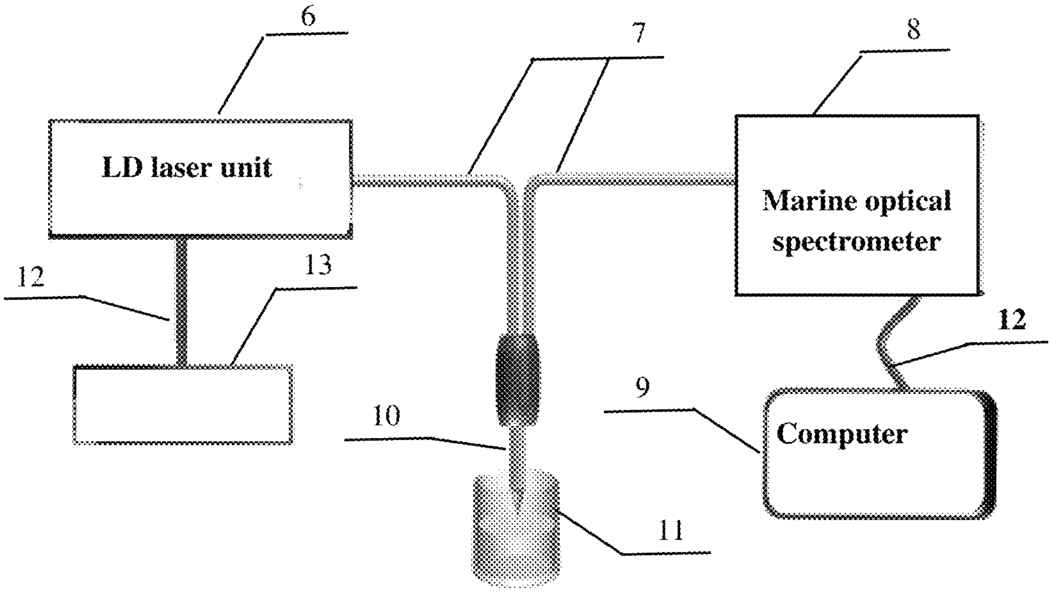
FIG. 2 is a schematic diagram illustrating a fiber-optic seawater salinity sensor system according to embodiments of the present disclosure.

FIG. 2 is a schematic diagram illustrating a fiber-optic seawater salinity sensor system according to embodiments of the present disclosure. In this embodiment, the fiber-optic seawater salinity sensor system is formed by connecting a semiconductor laser unit 6, a Y type optical fiber 7, a flat surfaced or tapered fiber-optic seawater salinity sensor 10, an optical spectrometer 8, and a computer 9 in series via a multimode optical fiber 12. Light with a center wavelength of 405 nm reaches the fiber-optic seawater salinity sensor 10 via the Y-shaped optical fiber 7. When a sensor probe of the fiber-optic seawater salinity sensor 10 is immersed in standard seawater 11, part of the light is reflected through the Y type optical fiber 7 to the optical spectrometer 8, and finally, a spectrum from the optical spectrometer is received and processed by the computer 9. Further, the semiconductor laser unit 6 is connected with an LCD display module 13 to complete the display of laser imaging via the LCD display module 13.

The sensitivity can be increased effectively by reducing the taper of the fiber-optic seawater salinity sensor 10.

Changes in seawater salinity lead to changes in the index of refraction, which in turn alter a reflection coefficient. The reflection coefficient is expressed using the following formulas derived from Fresnel's equations:

$$R_s = \frac{(n_1 \cos\theta_i - n_2 \cos\theta_t)^2}{(n_1 \cos\theta_i + n_2 \cos\theta_t)^2} \quad (1)$$

$$R_p = \frac{(n_1 \cos\theta_t - n_2 \cos\theta_i)^2}{(n_1 \cos\theta_t + n_2 \cos\theta_i)^2} \quad (2)$$

$$R = \frac{R_s + R_p}{2} \quad (3)$$

$$I_r = I_i R \quad (4)$$

Where $R_s$, $R_p$ and R denote a reflection coefficient of s-polarization, a reflection coefficient of p-polarization, and a reflection coefficient of a mean of the s-polarization and the p-polarization, $n_1$ and $n_2$ denote an index of refraction of a fiber core of the optical fiber and an index of refraction of a solution, respectively, $\theta_i$ and $\theta_t$ denote an angle of incidence and an angle of refraction, respectively, and $I_i$ and $I_r$ denote intensity of incident light and intensity of the reflected light. Meanwhile, evanescent wave intensity increases with the rise of an index of refraction of seawater, resulting in an increase in optical loss, and consequently the reflected light received by the optical spectrometer gets weakened. The light with the center wavelength of 405 nm, emitted out of the semiconductor laser unit 6, reaches the fiber-optic seawater salinity sensor 10 via the Y-shaped optical fiber 7. When the sensor probe of the fiber-optic seawater salinity sensor 10 is immersed in the standard seawater 11, part of the light is reflected through the Y type optical fiber 7 to the optical spectrometer 8. Finally, the spectrum from the optical spectrometer is received and processed by the computer 9.

Figure 3:
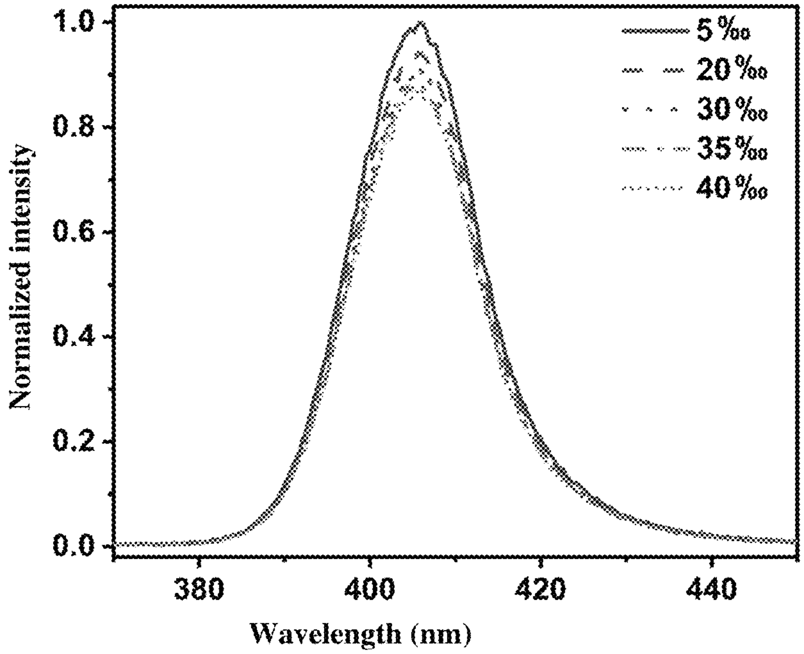
FIG. 3 is a schematic diagram illustrating a spectrum in a solution tested at different salinity levels according to embodiments of the present disclosure.
Figure 4:
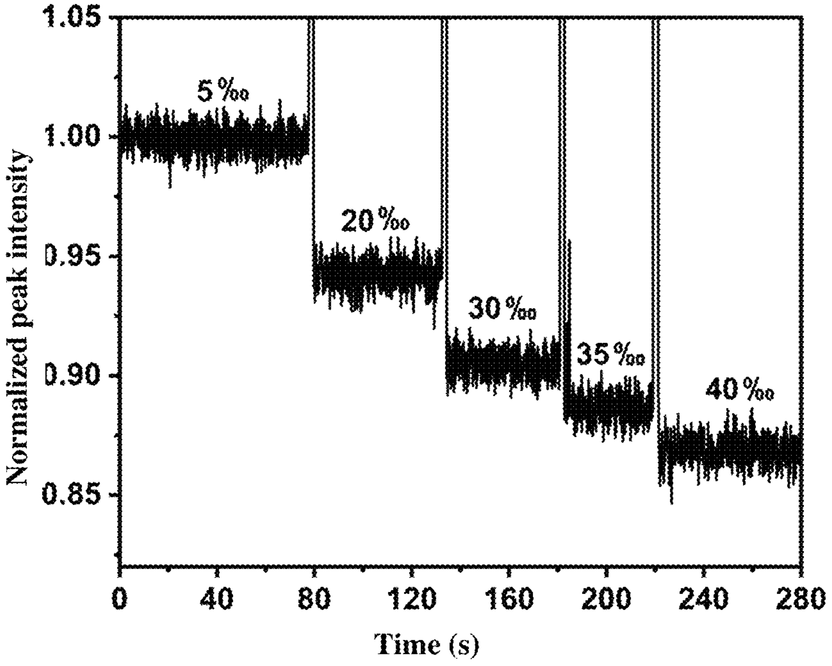
FIG. 4 is a schematic diagram illustrating a normalized peak intensity response in a solution tested continuously at different salinity levels according to embodiments of the present disclosure.
Figure 5:
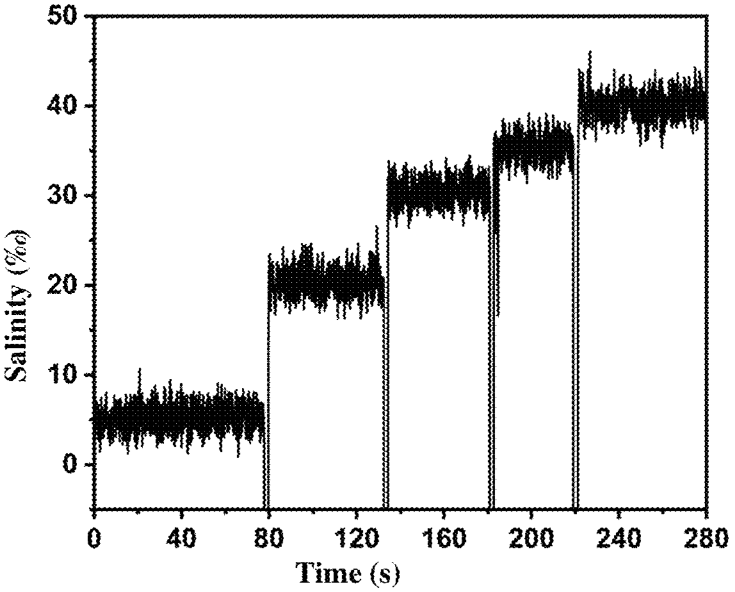
FIG. 5 is a schematic diagram of conversion of peak intensity to salinity according to embodiments of the present disclosure.
Figure 6:
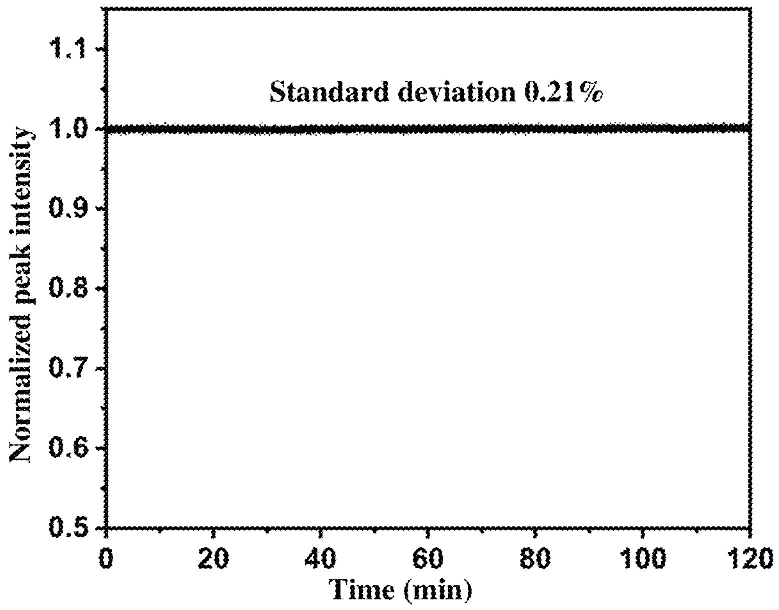
FIG. 6 is a schematic diagram of spectral peak intensity stability after immersion in standard seawater with 35‰ salinity according to embodiments of the present disclosure.

Measurements are made in the seawater at different salinity levels using the fiber-optic seawater salinity sensor 10 in the fiber-optic seawater salinity sensor system of the present disclosure to test the sensitivity of the fiber-optic seawater salinity sensor system to salinity. As shown in FIG. 3, spectral tests in a solution with different salinity levels demonstrated that the spectrum in the standard seawater at different salinity levels decreased as the salinity of the standard seawater increased. As shown in FIG. 4, the normalized peak intensity at 405 nm varied over time during the testing process. With a transition of seawater at different salinity levels, the peak intensity could respond rapidly, with response time of merely 0.1 second. To facilitate a more intuitive representation of the seawater salinity, a Y-axis is converted to salinity. As shown in FIG. 5, the fiber-optic seawater salinity sensor was immersed in the standard seawater at different salinity levels to obtain salinity values. The standard seawater 11 includes standard seawater with salinity levels of 5‰, 10‰, 20‰, 30‰, 35‰, and 40‰. As shown in FIG. 6, the fiber-optic seawater salinity sensor was immersed in the standard seawater with the salinity of 35% to present excellent stability.

Finally, it should be noted that the above is merely the embodiment of the present application, and is merely illustrative of the technical solution of the present disclosure, but is not intended to limit the scope of protection of the present disclosure. Simple modifications or equivalent replacements made on the technical solution of the present disclosure do not depart from the essence of the technical solution of the present disclosure and the scope of protection of the claims.

What is claimed is:

1. A fiber-optic seawater salinity sensor system, wherein the sensor system comprises a semiconductor laser unit (6), a Y type optical fiber (7), a fiber-optic seawater salinity sensor (10), an optical spectrometer (8), and a computer (9) which are connected in series via a multimode optical fiber (1,12), wherein light emitted out of the semiconductor laser unit (6) is transmitted to the fiber-optic seawater salinity sensor (10) via the Y type optical fiber (7), a sensor probe of the fiber-optic seawater salinity sensor (10) is immersed in seawater, reflected light (3) is reflected to the optical spectrometer (8) via the Y type optical fiber (7), and the computer (9) receives and processes a spectrum from the optical spectrometer (8) to obtain spectral intensity of the reflected light from the optical spectrometer (8); and an expression of a spectral intensity related reflection coefficient is as follows:

$$R = \frac{R_s + R_p}{2}$$

wherein $R_s$, $R_p$, and R denote a reflection coefficient of s-polarization, a reflection coefficient of p-polarization, and a reflection coefficient of a mean of the s-polarization and the p-polarization, respectively, wherein expressions of the reflection coefficient of the s-polarization and the reflection coefficient of the p-polarization are as follows:

$$R_s = \frac{(n_1 \cos\theta_i - n_2 \cos\theta_t)^2}{(n_1 \cos\theta_i + n_2 \cos\theta_t)^2}$$

$$R_p = \frac{(n_1 \cos\theta_t - n_2 \cos\theta_i)^2}{(n_1 \cos\theta_t + n_2 \cos\theta_i)^2}$$

wherein $n_1$ and $n_2$ denote an index of refraction of a fiber core of the fiber-optic seawater salinity sensor and an index of refraction of seawater, respectively, $\theta_i$ and $\theta_t$ denote an angle of incidence and an angle of refraction, respectively, $\theta_i$ and $\theta_t$ denote an angle of incidence and an angle of refraction, respectively, and $I_i$ and $I_r$ denote intensity of incident light and intensity of the reflected light.

2. The fiber-optic seawater salinity sensor system according to claim 1, wherein evanescent wave intensity increases with rise of an index of refraction of seawater, resulting in an increase in optical loss, and the reflected light received by the optical spectrometer reduced.

3. The fiber-optic seawater salinity sensor system according to claim 1, wherein a penetration depth $d_p$ of an evanescent wave and an index of refraction $n_2$ of the seawater meet the following relational expression:

$$d_p = \frac{\lambda}{2\pi n_1\left[\sin^2\theta_i - (n_2/n_1)^2\right]^{1/2}}$$

wherein $\theta_i$ denotes an angle of incidence.

4. The fiber-optic seawater salinity sensor system according to claim 1, wherein, in the fiber-optic seawater salinity sensor system, intensity $I_i$ of incident light and intensity $I_r$ of the reflected light meet the following relational expression:

$$I_r = I_i R$$

wherein R denotes a reflection coefficient.

5. The fiber-optic seawater salinity sensor system according to claim 1, wherein the fiber-optic seawater salinity sensor is a flat surfaced seawater salinity sensor, light propagates through the fiber-optic seawater salinity sensor in a form of total reflection, and a propagation pathway comprises incident light, the reflected light, an evanescent wave, and transmitted light.

6. A preparation method of a fiber-optic seawater salinity sensor of the fiber-optic seawater salinity sensor system according to claim 5, wherein the preparation method is as follows:

a preparation method of a flat surfaced seawater salinity sensor as the fiber-optic seawater salinity sensor comprises the following steps:

cutting an optical fiber, grinding and polishing an end face of the optical fiber to be smoothened and flattened, and finally washing the end face with water to remove any residual substance.

7. The fiber-optic seawater salinity sensor system according to claim 1, wherein the fiber-optic seawater salinity sensor is a tapered seawater salinity sensor, light propagates through the fiber-optic seawater salinity sensor in a form of total reflection, and a propagation pathway comprises incident light, the reflected light, an evanescent wave, and transmitted light.

8. The fiber-optic seawater salinity sensor system according to claim 7, wherein an angle of incidence of the reflected light at a tail end of the tapered seawater salinity sensor is smaller than a critical angle.

9. A preparation method of a fiber-optic seawater salinity sensor of the fiber-optic seawater salinity sensor system according to claim 7, wherein the preparation method is as follows:

a preparation method of a tapered seawater salinity sensor as the fiber-optic seawater salinity sensor comprises the following steps:

grinding and polishing an end face of an optical fiber with a core diameter of 1 mm to be smoothened and flattened, and washing the end face with pure alcohol and purified water;

allowing the washed optical fiber to be vertically immersed in a hydrofluoric acid solution with a concentration of 40%, and etching the optical fiber with an etching time difference of immersing the optical fiber along its length to form a tapered optical fiber; adjusting a taper of the tapered fiber-optic seawater salinity sensor by controlling an immersion depth of the optical fiber in the hydrofluoric acid solution and the etching time, wherein in this case, the optical fiber is immersed at a depth of 5 mm and etched for 28 hours; after removing a remaining coating outside a tapered region at the end of the optical fiber, rinsing the surface with water to remove residual hydrofluoric acid solution and reaction products; allowing the etched optical fiber to be sequentially immersed in a 1.0 mol $L^{-1}$ $Na_2CO_3$ solution and water for ultrasonic treatment for 20 minutes and 1 minute, respectively, until the surface is smooth; and finally, wiping the surface of the sensor with alcohol.

* * * * *